(12) United States Patent
Morimoto et al.

(10) Patent No.: US 7,362,677 B2
(45) Date of Patent: Apr. 22, 2008

(54) INFORMATION RECORD MEDIUM AND INFORMATION WRITING/READING APPARATUS

(75) Inventors: Yasuaki Morimoto, Kawasaki (JP); Ryouta Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 626 days.

(21) Appl. No.: 10/818,789

(22) Filed: Apr. 6, 2004

(65) Prior Publication Data
US 2005/0094516 A1 May 5, 2005

(30) Foreign Application Priority Data
Oct. 30, 2003 (JP) .............................. 2003-370520

(51) Int. Cl.
*G11B 7/005* (2006.01)
(52) U.S. Cl. ................ 369/53.21; 369/275.3; 369/47.28; 369/47.15
(58) Field of Classification Search ............ 369/275.3, 369/53.21, 47.28, 47.15
See application file for complete search history.

(56) References Cited

U.S. PATENT DOCUMENTS

| | | | | |
|---|---|---|---|---|
| 5,467,169 | A * | 11/1995 | Morikawa | 399/366 |
| 5,758,011 | A * | 5/1998 | Fujinami | 386/98 |
| 6,925,048 | B2 * | 8/2005 | Kuze et al. | 369/275.3 |
| 6,973,015 | B1 * | 12/2005 | Murakami et al. | 369/47.21 |
| 7,009,239 | B2 * | 3/2006 | Tokuda et al. | 257/302 |
| 2001/0030910 | A1 * | 10/2001 | Takita | 369/1 |
| 2002/0049678 | A1 * | 4/2002 | Oshima et al. | 705/51 |
| 2002/0051417 | A1 * | 5/2002 | Muramatsu et al. | 369/59.25 |
| 2002/0085714 | A1 * | 7/2002 | Inoha et al. | 380/201 |
| 2003/0002671 | A1 | 1/2003 | Inchalik et al. | 380/202 |
| 2003/0169660 | A1 * | 9/2003 | Shirai et al. | 369/53.21 |
| 2004/0042363 | A1 * | 3/2004 | Kobayashi et al. | 369/53.21 |

FOREIGN PATENT DOCUMENTS

| | | |
|---|---|---|
| JP | 4-159700 | 6/1992 |
| JP | 8-007339 | 1/1996 |
| JP | 2003-036595 | 2/2003 |
| JP | 2003/115163 | 4/2003 |

\* cited by examiner

*Primary Examiner*—Wayne Young
*Assistant Examiner*—Thomas Alunkal
(74) *Attorney, Agent, or Firm*—Greer, Burns & Crain, Ltd.

(57) ABSTRACT

An information writing/reading apparatus that cooperates with an information record medium including a ROM area and a RAM area, either the RAM area or the ROM area having in advance control information recorded thereon used to limit reading and/or writing of information, the information writing/reading apparatus including an optical pick-up unit for reading information stored on the information record medium; and a control unit for, based on the control information read by the optical pick-up unit, limiting reading and/or writing of information from/to the other area on which the control information is not recorded and outputting a signal which notifies of presence of the other area only out of the ROM area and the RAM area on the information record medium.

19 Claims, 11 Drawing Sheets

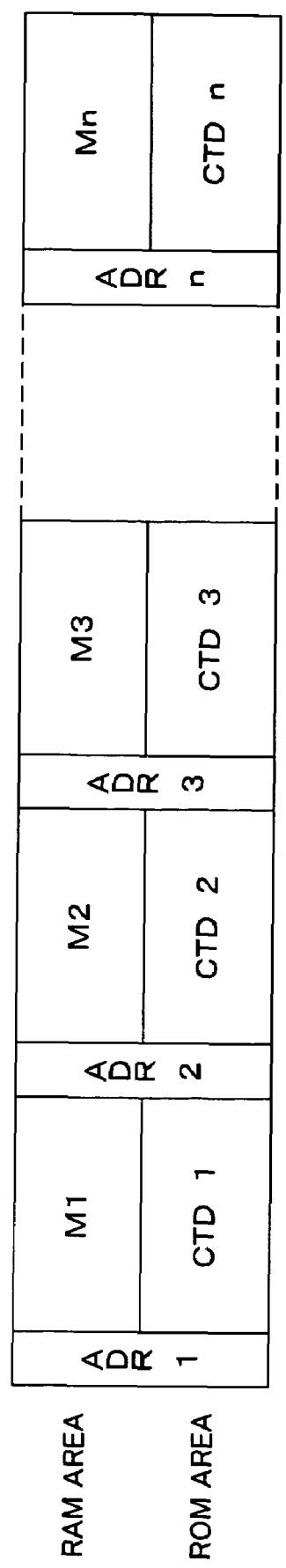

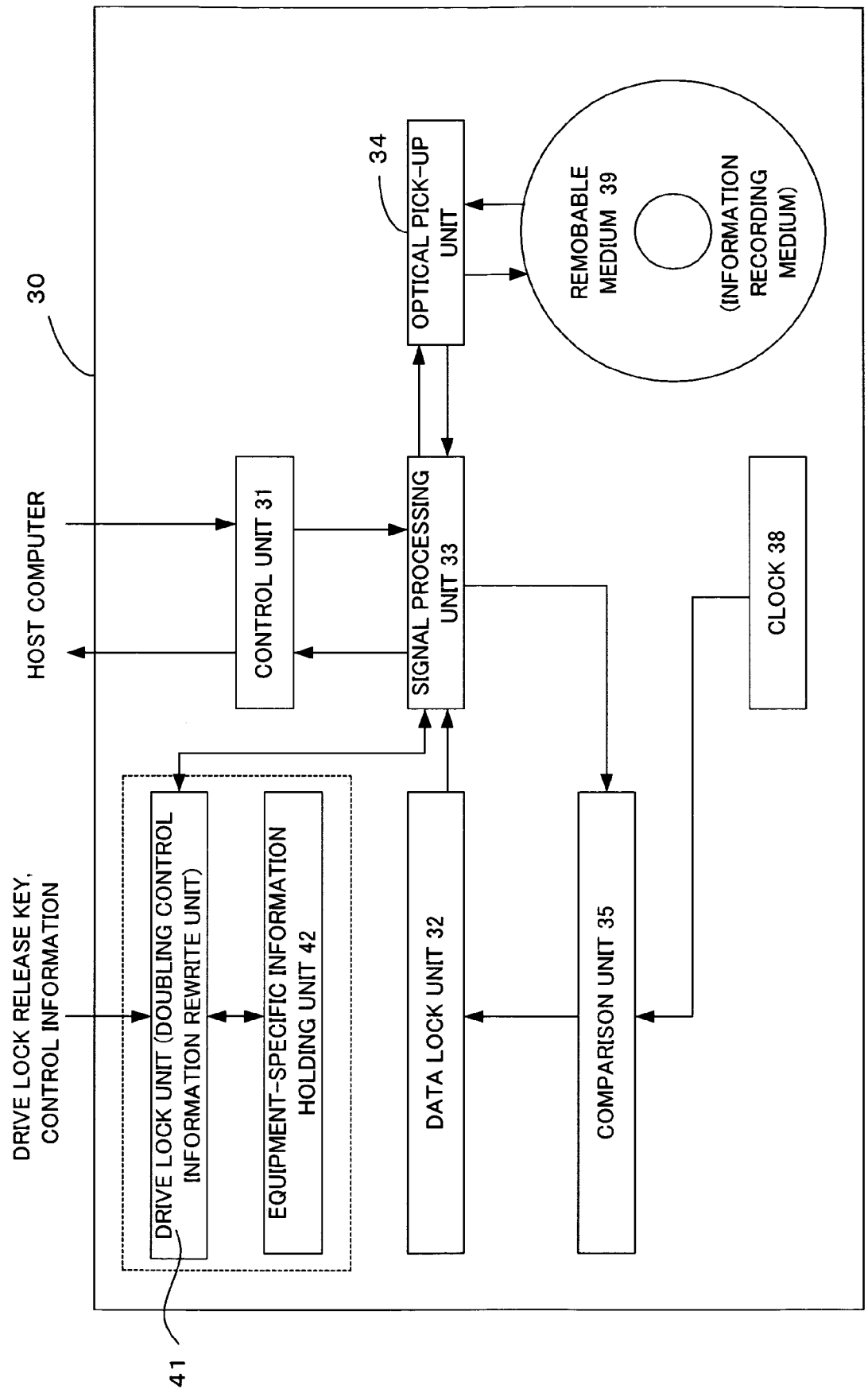

INFORMATION RECORD MEDIUM AND INFORMATION WRITING/READING APPARATUS

BACKGROUND OF THE INVENTION

1. Field of the Invention

The present invention relates to a removable medium (information record medium) and to a drive (information read/write apparatus) for writing information to the removable medium and/or reading information stored on the removable medium.

2. Description of the Related Art

Recently, contents such as texts, still images, movies, music, programs recorded on removable medium such as compact disks (including CD-R, CD-RW and others), DVD (including DVD±R, DVD±RW, DVD-RAM and others) and MO (Magneto Optical Disk) are sold. In order to protect copy rights of these contents such as movies, music and programs recorded on the removable medium, technologies for preventing rewrite (interpolation) of information against author's intentions and for preventing illegal copying by unauthorized third parties are devised. For example, music CD-ROM and others to which copy protection is performed fall under these technologies.

On the other hand, for removable medium and drives (apparatuses for writing information to the removable medium and/or reading information stored on the removable medium), research and development for the purpose of high-density recording and high-speed access are actively promoted. As part of these, hybrid-type removable medium such as concurrent ROMRAM (see Japanese Patent Application Laid-Open Pub. No. 1994-202820) having a ROM (Read Only Memory) unit which is not recordable and a RAM (Random Access Memory) unit which is recordable, partial ROM and drives corresponding to these removable medium are proposed.

FIG. 9 is a plan view illustrating the concurrent ROMRAM as an example of the hybrid-type removable medium. On a ROM area 101 and a ROM area 102, disk specification information, such as a media type, a serial number and frame information which is a minimum unit of recording, is recorded as ROM information by phase pit having concavity and convexity. On a user area 105 between the ROM area 101 and the ROM area 102, a ROM area 103 and a recordable RAM area 104 are formed in a superposed manner. In FIG. 9, the ROM area 103 and the RAM area 104 are shown such that these are concentrically arranged on different areas, but actually, magneto-optical recording film is formed on the ROM area 102 and the RAM area 103 is allocated on the magneto-optical recording film. Next, how the ROM area 103 and the RAM area 104 are formed in a superposed manner is described.

FIG. 10 is an explanatory diagram of a layer structure on a cross section of the concurrent ROMRAM. A polycarbonate substrate A, a dielectric film B, a magneto-optical recording film C such as TbFeCo, a dielectric film D, an Al film (reflective layer) E and a UV hardening film F as a protective layer are laminated. ROM information is fixedly recorded in phase pits PP and read utilizing optical intensity modulation. On the other hand, RAM information is recorded as magneto-optical records for which magnetization direction is reversed by irradiating a laser to the magneto-optical recording film to make a state that magnetization reversal tends to be initiated and applying a signal magnetic field and read utilizing the Polar Kerr effect in which reflective lights are changed depending on directions of magnetization on the magneto-optical recording film when a laser is irradiated to the magneto-optical recording film.

FIG. 11 is an enlarged view of a surface of the concurrent ROMRAM. As described in FIG. 10, ROM information is fixedly recorded in the phase pits PP, and RAM information is recorded by the magneto-optical records OMM along arrays of the phase pits PP. In this way, the ROM area formed by the phase pits PP and the RAM area formed by the magneto-optical records OMM are arranged in a superposed manner. In the above concurrent ROMRAM, the RAM function by the magneto-optical recording film may be held by the RAM area 101 and the ROM area 102 as well as a user area 105.

To the hybrid-type removable medium represented by the above described concurrent ROMRAM, advanced technologies for preventing rewrite (interpolation) of information against author's intentions and for preventing illegal copying by unauthorized third parties are proposed.

For example, according to Japanese Patent Application Laid-Open Pub. Nos. 2003-36595 and 2003-115163, an optical disk having a ROM area on which disk-specific information is recorded and a recordable RAM area is disclosed. Contents are recorded on either the ROM area or the RAM area. If contents recorded on the optical disk cited in the each patent document are copied to another optical disk, since information specific to the optical disk which is the copy destination and information specific to the disk which is the copy source are different, or since information specific to the optical disk is not recorded on the ROM area of the optical disk which is the copy destination from the beginning, contents recorded on the RAM area can not be used, and in this way, rewrite (interpolation) of information against author's intentions and illegal copying by unauthorized third parties are prevented. Further, according to the No. 2003-115163, the RAM area includes a security signature including a private key of a user, and when new contents are additionally recorded, authentication and encryption are performed based on a public key method via network.

However, in conventional cases, an area on which contents are recorded and an area on which information for limiting writing/reading of contents on the removable medium are physically different areas, and each area has been administered by a host computer (personal computer, server and others) controlling the drive via software. Therefore, for example, by analyzing I/O processes on the host computer side, information for limiting writing/reading of contents and its method could be found out, and as a result, by replacing it with software which includes ill-intentioned codes, contents could be interpolated or illegally copied.

In these cases, it is difficult to identify the interpolator and the like. Further, in conventional cases, since access to a physically different area is needed when writing or reading contents, a limiting factor of high-speed access, which is a purpose in removable medium and the drive, has been constituted.

SUMMARY OF THE INVENTION

It is therefore an object of the present invention to provide a removable medium (information record medium) which ensures validity of information without depending on the host computer side. Ensuring validity of information represents preventing rewrite (interpolation) of information against author's intentions and being enabled to identify the interpolator if interpolation was performed, or preventing illegal copying by unauthorized third parties and being enabled to identify who has copied it if copying was performed.

Another object of the present invention is to provide information record medium which enables both ensuring of validity of information and high-speed access. Further, a purpose of the present invention is to provide an information writing/reading apparatus which ensures validity of information recorded on information record medium without depending on the host computer side.

In order to achieve the above objects, according to a first aspect of the present invention there is provided an information writing/reading apparatus that cooperates with an information record medium including a ROM area and a RAM area, either the RAM area or the ROM area having in advance control information recorded thereon used to limit reading and/or writing of information, the information writing/reading apparatus comprising an optical pick-up unit for reading information stored on the information record medium; and a control unit for, based on the control information read by the optical pick-up unit, limiting reading and/or writing of information from/to the other area on which the control information is not recorded and outputting a signal which notifies of presence of the other area only.

Preferably, the control information includes period data specifying an available period, the apparatus further comprising a clock for outputting time information; and a comparison unit for comparing the period data included in the control information read by the optical pick-up unit with the time information output from the clock, to make a first determination to determine whether it is within the available time or not, the control unit limiting reading and/or writing of information from/to the other area depending on the result of the first determination.

The control information may include identification authentication data identifying a user, the apparatus further comprising an identification authentication data input unit for inputting information for identifying the user, the comparison unit comparing the identification authentication data included in the control information with the information for identifying the user input to the identification authentication data input unit, to make a second determination to determine whether the user is a normal user or not, the control unit limiting reading and/or writing of information from/to the other area depending on the result of the second determination.

The information writing/reading apparatus may further comprise an equipment-specific information holding unit for holding therein recorded equipment-specific information on the information writing/reading apparatus; and a drive lock unit to which information on the information writing/reading apparatus is input, the drive lock unit collating the information on the information writing/reading apparatus input to the drive lock unit with the equipment-specific information and, if these are not identical, outputting a signal for halting operations of the information writing/reading apparatus to the control unit.

In order to attain the above objects, according to a second aspect of the present invention there is provided an information record medium comprising a ROM area and a RAM area, wherein either the ROM area or the RAM area has thereon recorded in advance control information used for limiting reading and/or writing of information, and wherein based on the control information, a limitation is imposed on reading and/or writing of information from/to the other area having no control information recorded thereon, with objects being limited which is enabled for reading and/or writing of the control information.

To accomplish the above objects, according to a third aspect of the present invention there is provided an information writing/reading system comprising an information writing/reading apparatus which incorporates an information record medium having a ROM area and a RAM area; and a host computer connected to the information writing/reading apparatus, wherein either the RAM area or the ROM area has thereon recorded in advance control information used for limiting reading and/or writing of information, and wherein the information writing/reading apparatus notifies the host computer of only presence of an area from/to which reading and/or writing of information is not limited, out of the other area having no control information recorded thereon, based on the control information, the information writing/reading apparatus limiting reading and/or writing of information from/to the other area depending on instructions to the other area input from the host computer.

By using information record medium and an information writing/reading apparatus of the present invention, it is possible to flexibly set types of access allowed to users and conditions when an auto lock function is activated. Since a host computer connected to the information writing/reading apparatus can not recognize information for controlling writing/reading of contents stored on the information record medium, which is called control information, it is possible to prevent interpolation of information by impersonation on the host computer side, illegal copying and the like, and validity of information recorded on the information record medium is ensured.

In the information writing/reading apparatus, since information in the ROM area and information in the RAM area can be simultaneously obtained by one-time access to an address, or reading of information in the ROM area and writing of information to the RAM area can be simultaneously performed, high-speed access can be achieved.

BRIEF DESCRIPTION OF THE DRAWINGS

The above and other objects, aspects, features and advantages of the present invention will become more apparent from the following detailed description when taken in conjunction with the accompanying drawings, in which:

FIG. 1 is an explanatory diagram of relationship between contents and control information recorded on a removable medium (information record medium) of a first embodiment;

FIG. 7 is a block diagram of the drive (information writing/reading apparatus) for use in the second embodiment;

DESCRIPTION OF THE PREFERRED EMBODIMENTS

Embodiments of the present invention will now be described with reference to the drawings. It is however to be noted that the technical scope of the present invention is not limited to the embodiments but covers the invention and equivalents thereof set forth in the claims.

The embodiments of the present invention are classified into two (2) types depending on roles of a ROM area and a RAM area on information record medium. One is a case that validity of information is ensured by use of information record medium having the RAM area on which contents are recorded and the ROM area on which control information for controlling reading and/or writing of contents is recorded, and the other is a case that the roles of the ROM area and the RAM area in the first case are reversed, in other words, that validity of information is ensured by use of information record medium having the ROM area on which contents are recorded and the RAM area on which control information for controlling reading of contents is recorded. The information record medium and the information writing/reading apparatus used the information record medium are described below for each case.

Firstly, as a first embodiment, the case is described, in which validity of information is ensured by use of information record medium having the RAM area on which contents are recorded and the ROM area on which control information is recorded. In the first embodiment, the concurrent ROMRAM described in FIG. 9 to FIG. 11 will be used.

In first embodiment, contents created by users are stored on the RAM area, and by limiting access to the contents (new creation, additional writing, modification, deletion, readout and others) based on control information stored on the ROM area in advance, validity of information will be ensured. For example, it is possible to set up such that a user is authenticated by identification authentication data recorded in the control information and only the successfully authenticated user can access the information record medium.

Alternatively, it is also possible to set up such that the information record medium can be accessed as long as it is within the available period defined by period data recorded in the control information. By combining the identification authentication data, the period data and other control items, it is possible to set various access modes, coordinated with purposes of use of the information record medium.

FIG. 1 is an explanatory diagram of relationship between contents and the control information recorded on the information record medium of the first embodiment. In FIG. 1, each of contents M1 to Mn (n is a natural number) stored in RAM area is managed by addresses ADR1 to ADRn, and the control information CTD 1 to CTDn for each content are stored on the ROM area which can be read by an addresses identical to the address corresponding to each content.

Figure 9:
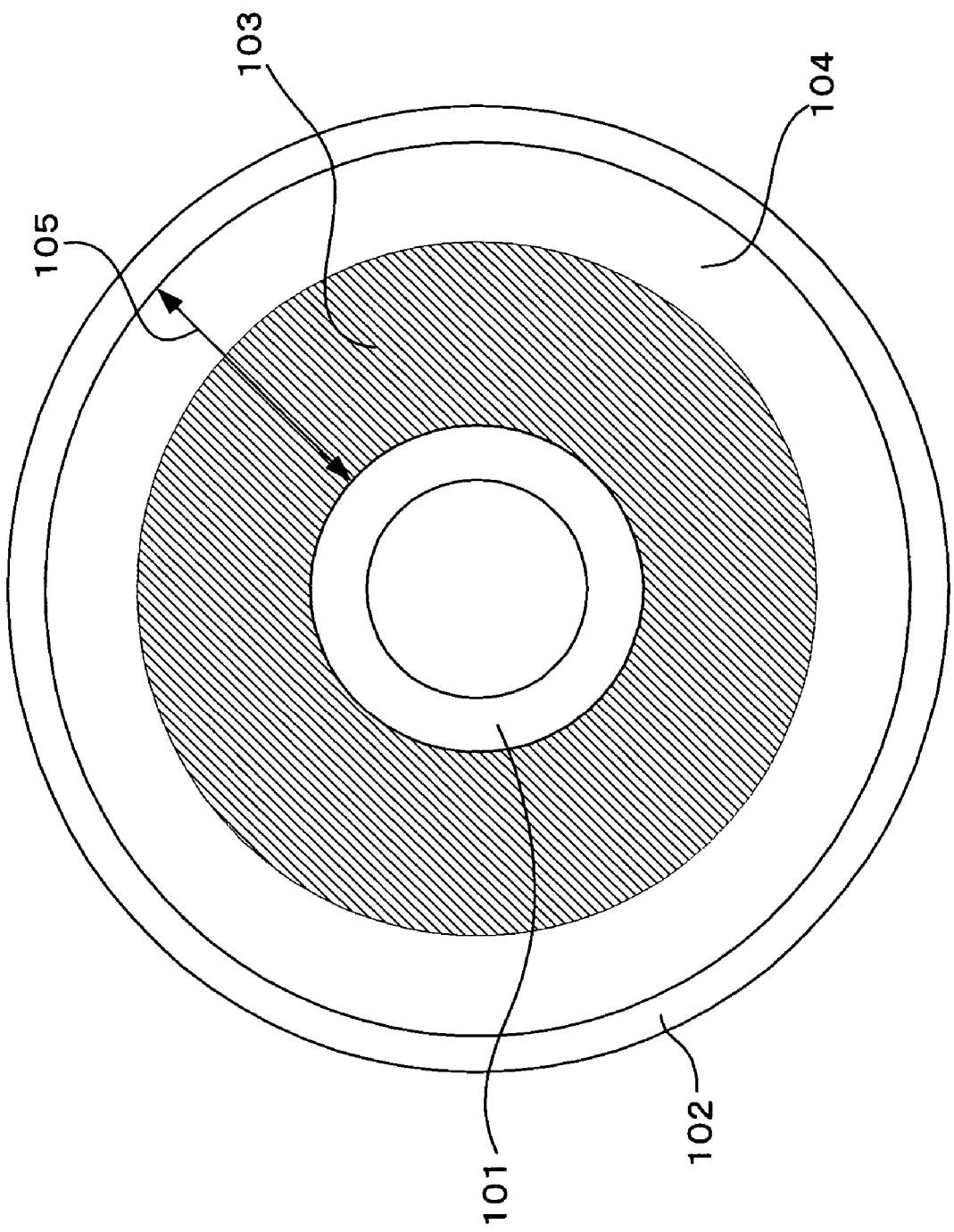
FIG. 9 is a plan view illustrating the concurrent ROM-RAM as an example of the hybrid-type removable medium.
Figure 10:
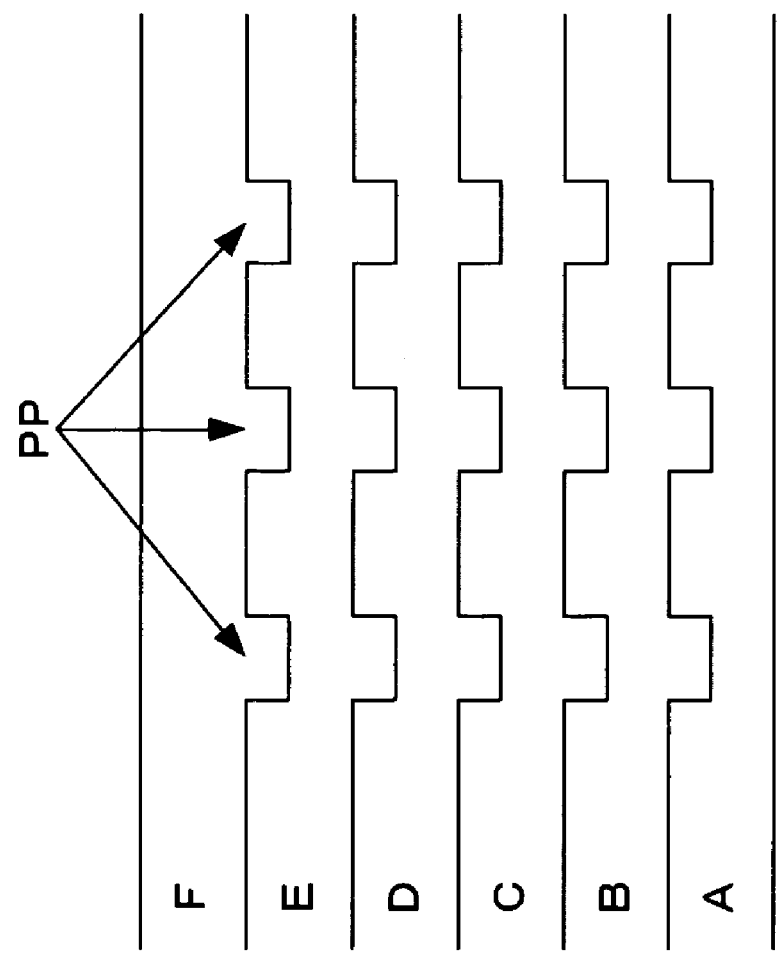
FIG. 10 is an explanatory diagram of a layer structure on a cross section of the concurrent ROMRAM.
Figure 11:
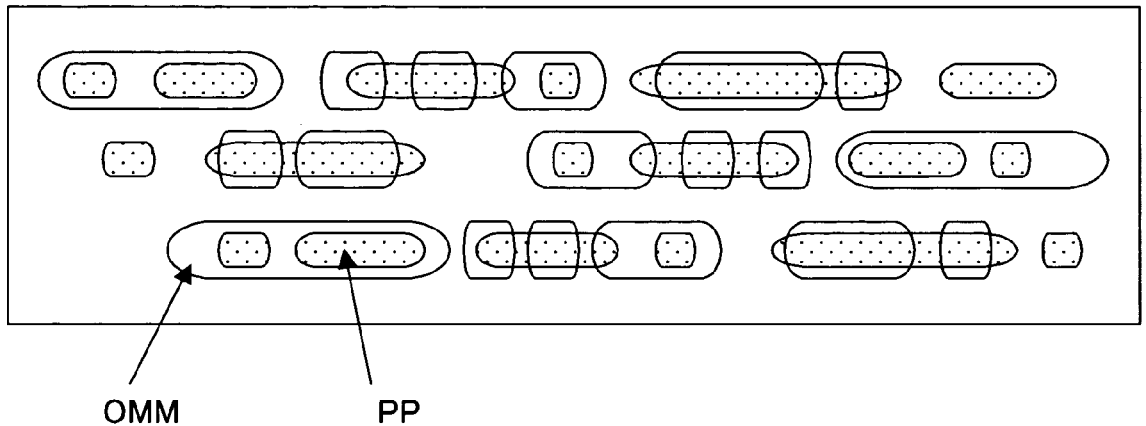
FIG. 11 is an enlarged view of a surface of the concurrent ROMRAM.

By using the concurrent ROMRAM illustrated in FIG. 9 to FIG. 11, the ROM area and the RAM area can be managed by identical addresses. In this way, for any natural number i ($1 \leq i \leq n$), a content Mi and control information CTDi corresponding to the content Mi can be simultaneously obtained by one-time access to the address ADRi. The number of addresses n formed on the information record medium can be changed freely, coordinated with capacities of the information record medium, types of the contents stored, purposes of use of the information record medium and others.

As the content Mi, general digital data are stored, which are movies (moving images), music, still images, plain texts, text data with format information (word processor data), spread sheet data, programs and others. In the first embodiment, since the content Mi is stored on the RAM area, additional writing of information, deletion and the like are freely performed based on the authority given to the user as long as access is not limited.

Sizes of the ROM area and the RAM area at the address ADRi are equivalent and can be set to any size. For example, if a plurality of text files which have a file size of approximately several kilo-bytes (KB) is stored, the RAM area may be reserved, coordinated with a maximum size of the text file, and if a plurality of moving image data which have a file size of few hundred mega-bytes (MB) or more, it may be preferred to reserve the RAM area such that the image data are stored across a plurality of addresses. A size of the RAM area for each address (which is a size of the ROM area at the same time) is changed depending on the orderer's purpose of use of the removable medium. The simplest way is to coordinate the size to a minimum unit for recording of the drive.

Figure 2A:
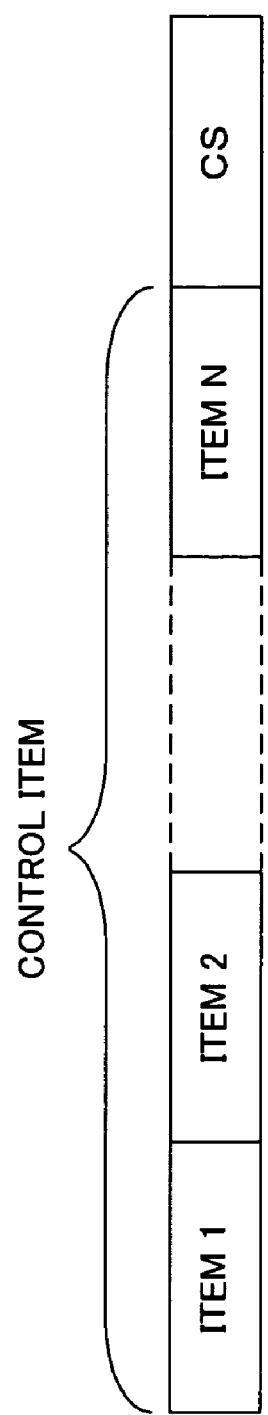
FIG. 2A shows an example of a data structure of control information CTDi.

FIG. 2A shows an example of a data structure of the control information of FIG. 1. In the control information, a plurality of control items ITEMj ($1 \leq j \leq n$) and a checksum CS are stored. The checksum CS is a value generated from data values of the plurality of the control items by a hash function and, when it is determined whether writing/reading of contents is limited or not, compared with a hash value (described later) generated by the drive, and then an access mode to the contents is determined.

The control items are not necessarily plural, and the case of single item may be considered. In this case, the first embodiment may be implemented without the checksum CS. The checksum CS is used to speed up above comparing operation if a plurality of the control items exists. Of course, if the checksum is used for the single control item, this poses no problem at all.

Figure 2B:
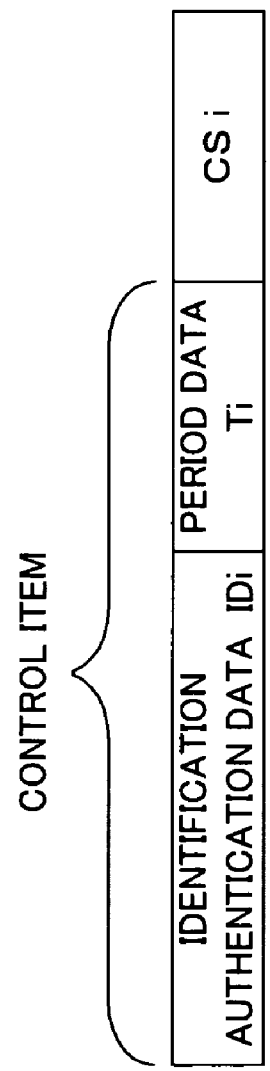
FIG. 2B is a diagram illustrating a specific example of the data structure of the control information.

FIG. 2B is a diagram illustrating a specific example of the data structure of the control information. In the control information of FIG. 2B, as an example of the control information CTDi corresponding to the contents Mi, two (2) control items, which are identification authentication data IDi and period data Ti, correspond to it. The checksum CSi is added to the two (2) control items.

As the identification authentication data IDi, information for authenticating a user of the information record medium is recorded. For example, this is a personal identification code, a belonging organization code, a code showing a duty position and authority, a location code specifying factories, buildings and others. This may be used such that latitude and longitude are corresponded to the location code by using a flash memory with GPS (Global Positioning System) function as a data lock release key described later.

As the period data Ti, detailed representation of time is recorded using items such as year, month, day, hour, minute and second. For example, a time at which the function for not allowing writing of information after that time is activated is specified alone, or the period for which readout of information is allowed is specified by a start date and an end date. The checksum CSi is a value generated from the preceding two (2) items by the hash function.

As described above, there are the case that single control item exists and the case that a plurality of control items exist and variations of these are described taking the above identification authentication data and period data as examples. In "the case that the identification authentication data is used alone", the identification authentication data recorded on the removable medium and an identification authentication data given to the drive are checked for each address, and by performing a user authentication such that contents of the address can be accessed only if these match, validity of information is ensured.

In this case, access to the contents represents that contents are newly created, additionally written, modified, deleted, viewed (read) and the like. For example, it is possible to use the identification authentication data such that all the users are allowed to view and only the user authenticated by the identification authentication data can perform additional writing and modification. Then, since only the user authenticated by the identification authentication data can modify information, if interpolation is performed, it is possible to identify the interpolator.

Also, if only the user authenticated by the identification authentication data is allowed to view and other users are forbidden from performing any access, only the user authenticated by the identification authentication data can perform copying, so if copying is performed, it is possible to identify who performs copying. The access to the contents is changed freely. It is possible to set such that one content is allowed to be viewed and other content is allowed to be additionally written and deleted.

In "the case that the period data is used alone", the period data recorded on the removable medium and time information of the drive are compared for each address, and by enabling access to the contents of the address only if decided that it is within the available period, validity of information is ensured. For example, it is possible to set such that new creation and additionally writing is allowed within the available period and only viewing is allowed after the available period.

In "the case that the identification authentication data and the period data are used in combination", by enabling access to the contents of each address only if user authentication based on the identification authentication data succeeds and it is decided from the period data that it is within the available period for each address, validity of information is ensured. By combining two (2) control items, the access to the contents can be limited in detail.

Also, in "the case that the identification authentication data and the period data are used in combination", besides above mode of access, by using the control information, it is possible to achieve the auto lock function for information which automatically blocks (locks) access to the information if predefined conditions are satisfied and, after locked, only the user possessing a key can access the information. For example, the identification authentication data can be used as the key for the auto lock function as follows.

When accessing to the contents, whether it is within the available period or not is only decided by the period data, and if it is within the available period, all the users are allowed to perform predefined accesses (for example, only new creation and additional writing). After the available period, only the user approved by the user authentication based on the identification authentication data is allowed to perform predefined accesses (for example, only modification and additional writing), and other users are allowed to perform predefined assess only (for example, only viewing). Then, only the user authenticated by the identification authentication data (owner of the key) can access information after locked.

A specific example to which the removal media (information record medium) of the first embodiment is applied is then described. For example, the removable medium can be applied to storage for medical chart files in which results of medical care is recorded for each patient. The medical chart file can be newly created and modified by a doctor who examined a patient on consultation day (for convenience, the medical chart file is created on the same day), and after consultation day, it is locked and can be only viewed.

Removable medium are ordered by a hospital and the removal media on which sufficient size for storing the medical chart file for each patient at each address are delivered and distributed to each doctor. For its control items, information (for example, a name of the hospital, a name of the doctor and a staff number) for identifying the doctor who can access contents is recorded as the identification authentication data, and data for defining that the available period is only one (1) day on which the file is created are recorded as the period data, and enabling modification only within the available period is set as the access to the contents.

In this way, only the doctor identified by the identification authentication data can record the medical chart file on the RAM area. Modification is available only for the day on which the medical chart is created. Therefore, it is possible to identify the creator of the medical chart file. Since the medical chart can not be modified after the available period, interpolation is prevented, and originality is assured. Since updated information for the patient is recorded at another address, so it is possible to keep a record of the course of the medical care completely.

Besides this case, the removable medium of the first embodiment can be applied to the cases in which transparency is socially required and interpolation of information is impermissible, such as inspection records of power plants and chemical plants or accounting records of companies. By corresponding dates of a year to each address, it is also possible to use it as an electronic diary which can be written only on the current day.

In FIG. 2B, the control items which are the identification authentication data and the period data are used, but it is possible to incorporate items for limiting or extending operations of the contents, such as a number of times for which the file format contents can be opened (if exceeding the number, the file cannot be opened), into the control information. These control items may be used alone or in combination with other control items.

The information writing/reading apparatus and the operation of the information writing/reading apparatus used in the first embodiment are then described. For the purpose of simplification, following description of the first embodiment is assumed that an access policy is set, in which only if the user authentication based on the identification authentication data succeeds and it is decided by the period data that it is within the available period (data lock released state), the contents can be newly created, additionally written and modified, and otherwise (data lock state), the contents can only be viewed.

Figure 3:
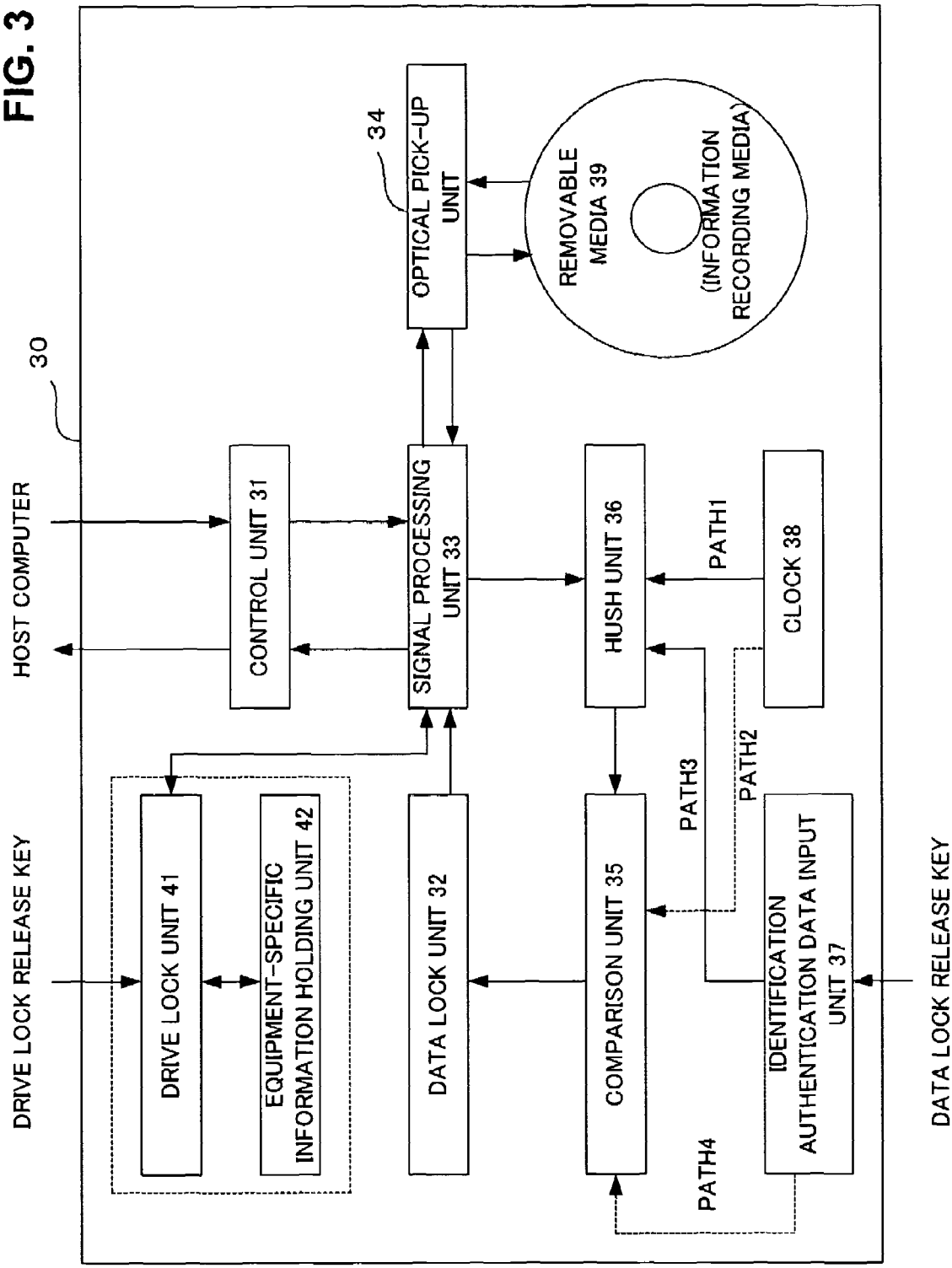
FIG. 3 is a block diagram of a drive (information writing/reading apparatus) for use in the first embodiment.

FIG. 3 is a block diagram of the information writing/reading apparatus (drive 30) used in the first embodiment. The drive 30 includes a drive lock unit 41 and an equipment-specific information holding unit 42 which are used for certifying approval of use of the drive (the information writing/reading apparatus) 30 as well as a control unit 31 which are used for controlling writing/reading of the contents of the removable medium 39, a signal processing unit 33, an optical pick-up unit 34, a hash unit 36, a clock 38, an identification authentication data input unit 37, a comparison unit 35 and a data lock unit 32.

In the equipment-specific information holding unit 42, a serial number which specifies the drive 30, a media type which can be used with the drive 30, data regarding to qualified persons allowed to use the drive 30 and others are recorded.

The drive lock unit 41 performs an authentication process for limiting use of the drive to the qualified person. The drive lock unit 41 performs authentication to approve use of the drive based on information in input drive lock release key and, if the authentication is failed, outputs a signal (drive lock signal) for halting the operation of the drive 30. If the authentication succeeds, use of the drive is continued as it is.

The drive lock release key includes the same kind of information as the information held by the equipment-specific information holding unit 42, and any piece of information or combination thereof is used for the authentication. The input and authentication of the drive lock release key are performed in various ways. For example, in a possible method, the drive lock unit 41 serves also as a memory reader, and flash memory in which the serial number of the drive 30 is recorded (drive lock release key) is distributed only to the qualified person, and by inserting the flash memory into the drive lock unit 41 (memory reader), whether a drive serial number stored in the equipment-specific information holding unit 42 and the serial number in the flash memory are identical or not is decided.

In addition, employee numbers for individuals who are qualified persons may be stored in the equipment-specific information holding unit 42 and whether or not an employee number input by a numeric pad equipped on the drive (drive lock release key) is identical to the employee number held be the equipment-specific information holding unit 42 may be decided. Whether or not latitude and longitude of current position specified by the GPS function equipped in the drive lock release key is identical to latitude and longitude information indicating location of a factory held by the equipment-specific information holding unit 42 may be also decided. Further, a media type which can be used as the drive lock release key may be recorded in the equipment-specific information holding unit 42 and whether or not this is identical to the media type included in disk specification information (the ROM area 101 or the ROM area 102) recorded on removable medium (information record medium) 39 which is inserted into the drive (information writing/reading apparatus) 30 may be decided.

Other than flash memory, cards with bar codes, magnetic cards, IC cards, physical keys, biometric fingerprints, irises and voiceprints, or hand-held devices can be used as the drive lock release key. There is a case that the authentication process for approving use of the drive 30 is not performed and its use is not limited. In this case, a structure in which the drive lock unit 41 and the equipment-specific information holding unit 42 are omitted may be available.

When the removable medium 39 is inserted, the control unit 31 notifies a host computer (PC, server and others) connected to the drive 30 of only the presence of the RAM area out of the ROM area and the RAM area on the removable medium 39 and, when instructed from the host computer, controls inside of the drive 30 depending on the instruction. The reason for notifying only the presence of the RAM area, which depends on that the control information is recorded on the ROM area in the first embodiment, is to prevent the control information from being input and output between the drive 30 and the host computer.

Specifically, the control unit 31 returns information read from the removable medium 39 to the host computer in response to the read instruction and performs a process for writing information received from the host computer onto the removable medium 39 in response to the write instruction. When the drive lock signal is input from the signal processing unit 33, the control unit 31 performs control to halt the drive 30 and, when the data lock signal is input from the signal processing unit 33, outputs information to the host computer such that accesses to the correspond contents are appropriately processed by OS of the host computer. For example, if viewing is only available as the access to the content, the attribute information of the file corresponding to that content will be changed to readout only (read only).

The signal processing unit 33 performs a process for digitizing analog source signals such as servo signals, format-related signals, the control information stored on the ROM area and the contents stored on the RAM area, which are input from the optical pick-up unit 34, and outputs these to the control unit 31 or to the hash unit 36 (in the case of the control information). It also outputs information written onto the removable medium 39 to the optical pick-up unit 34. It receives the data lock signal input from the data lock unit 32 and the drive lock signal input from the drive lock unit 41 and outputs these to the control unit 31.

The optical pick-up unit 34 detects the control information (see FIG. 2), usage information of the disk, servo information and others, which are recorded on the removable medium 39, as the analog source signals. It also records information input from the signal processing unit 33 onto the removable medium 39. In this embodiment, the RAM area has magneto-optical records, and magnetic field modulation recording is employed, and it is possible to detect the control information on the RAM area simultaneously while recording information (contents) onto the RAM area. It is also possible to simultaneously obtain the magneto-optical signals (contents) on the RAM area and the control information on the ROM area.

The hash unit 36 generates a hash value with the hash function, based on information input from the identification authentication data input unit 37 and time information input from the clock 38, and outputs it with the control information input from the signal processing unit 33 to the comparison unit 35. When the hash value is generated, in order to determine which items in the time information input from the clock 38 are used, the hash unit 36 refers to the period data included in the control information input from the signal processing unit 33. The same items as the items used in the data included in the period data are then extracted from the time information and used for generation of the hash value. For example, if the period data is October 2003, then the items of year and month in the time information are used. For example, if the period data is 10 O'clock Oct. 10th 2003, then the items of year, month, day and hour in the time information are used.

The information input to the hash unit 36 depends on the control items included in the control information of the removable medium 39 used. The configuration of FIG. 3 is a configuration in the case that, based on the access policy described at the start of the description of the writing/reading apparatus, as the control item, in "the case that the identification authentication data and the period data are used in combination", only if user authentication based on the identification authentication data succeeds and it is decided from the period data that it is within the available period, access to the contents of each address is enabled. If the identification authentication data is only used, the clock 38 may be omitted. In like wise, if the period data is only used, the identification authentication data input unit 37 may be omitted. If another data item exists as the control item, the configuration in which an input unit corresponding to that control item is provided and input data for the control item is output from the input unit to the hash unit 36 or others may be possible.

The clock 38 outputs accurate time information to the hash unit 36 via a path PATH1. Real line PATH 1 in FIG. 3 is a configuration in case the period data is not specified by a range (such as October 2003 or 13 O'clock 45 minutes January first 2004) If the period data is specified by a range (such as from October first 2003 to Oct. 31st 2003 or within one (1) hour from 13 O'clock 45 minutes January first 2004), the clock 38 outputs the time information to the comparison unit 35 via a path PATH2 shown by a dotted line. The configuration in which the path PATH1 and the path PATH2 are omitted may be available depending on the mode of utilization of the period data.

The identification authentication data input unit 37 outputs the identification authentication data included in the input data lock release key to the hash unit 36 via a path PATH3. In "the case that the identification authentication data and the period data are used in combination", if the identification authentication data is used as a key for the auto lock function, a configuration in which the identification authentication data is input to the comparison unit 35 via a path PATH4 shown by a dotted line may be available. The path PATH3 and the path PATH4 may be omitted depending on mode of utilization of the control items.

The input of the data lock release key is performed in various ways. By way of example, in a possible method, the identification authentication data input unit 37 serves also as a memory reader, and flash memory in which the identification authentication data are recorded (data lock release key) is distributed only to the qualified persons, and by inserting the flash memory into the identification authentication data input unit 37 (memory reader), the identification authentication data in the flash memory are supplied to the drive 30.

Other than flash memory, cards with bar codes, magnetic cards, IC cards, physical keys, biometric fingerprints, irises and voiceprints and others may be used as the data lock release key. It is understood from this description that if the drive lock unit 41 for certifying approval of use of the drive 30 is provided, the identification authentication data input unit 37 and the drive lock unit 41 can be merged. In this case, the drive lock release key and the data lock release key may be merged.

For example, it is possible to record necessary information into an IC card which can be used as an employee ID and commonly utilize it as the drive lock release key and the data lock release key. Information regarding to the control item other than the identification authentication data may also be contained in the data lock release key. By inputting the data lock release key, if there is an input unit corresponding to each control item, each piece of necessary data is supplied to the corresponding input unit.

The comparison unit 35 compares the checksum included in the control information input from the hash unit 36 with the hash value input from the hash unit 36 and outputs the result of the comparison to the data lock unit 32. Depending on the mode of utilization of the control items, there may be the case that the user authentication is performed by comparing the identification authentication data included in the control information input from the signal processing unit 33 with the identification authentication data input from the identification authentication data input unit 37 and the case that it is decided whether it is within the available period or not by comparing the period data included in the control information input from the signal processing unit 33 with the time information input from the clock 38.

The data lock unit 32 outputs the data lock signal to the signal processing unit 33 in the case such as that the checksum and the hash value are not identical, that the user authentication is failed and that it is not within the available period, depending on the result of the comparison input from the comparison unit 35. In FIG. 3, the removable medium is inserted into the drive 30 by a slot-in mechanism or an electric tray and is not always contained in the drive 30.

The operation of the information writing/reading apparatus of the first embodiment is then described.

Figure 4:
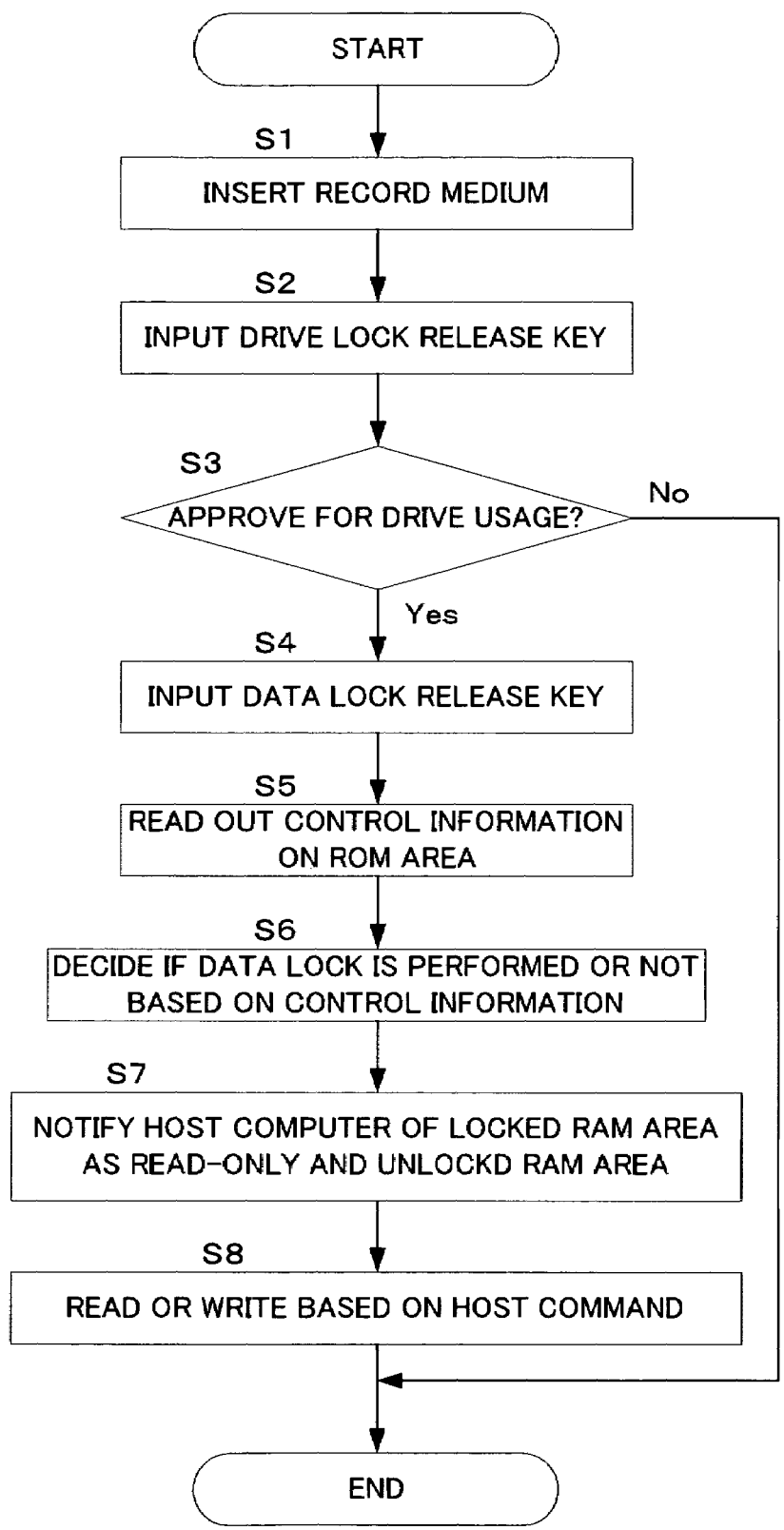
FIG. 4 is a flowchart describing the operation of the drive of the first embodiment.

FIG. 4 is a flowchart describing the operation of the drive (information writing/reading apparatus) 30 of the first embodiment. First, the removable medium 39 is inserted into the drive 30 (S1). The drive lock key is then input (S2). As described for the drive lock unit 41 of FIG. 3, the input of the drive lock key may take various forms depending on flash ROM, physical keys and others, and for example, a flash memory is inserted.

When the drive lock key is input, whether the use of the drive is approved or not is decided (S3). As described for the drive lock unit 41 of FIG. 3, the authentication of approval of use performed in step S3 may also take various forms depending on the drive lock release keys, and for example, a flash memory is used, and a process is performed such that information of the qualified persons recorded in the equipment-specific information holding unit 42 is checked with the information recorded in the flash memory. If the approval of use of the drive 30 is not authenticated, processes in step S2 and step S3 are omitted.

If the use of the drive 30 is not approved in step S3 (No in S3), the drive lock signal from the drive lock unit 41 is input to the control unit 31 via the signal processing unit 33, and the drive 30 is halted. If the use of the drive 30 is approved in step S3 (Yes in S3), the data lock release key is subsequently input (S4).

As described for the identification authentication data input unit 37 of FIG. 3, the input of the data lock release key in step S4 may take various form. It is possible to merge the drive lock unit 41 and the identification authentication data input unit 37 and to merge the drive lock release key and the data lock release key, and in this case, step S4 is incorporated in step S2, and step S4 may be omitted.

When step S4 (if step S4 is omitted, then step S3) is competed, the control information on the ROM area is read out (S5), and the data lock determination for the content of each address is performed based on the read control information. In the determination in step S6, the user authentication with the identification authentication data and the determination with the period data which determines whether it is within the available period or not are performed, as described in the place regarding to the variations of the control items of FIG. 2 ("the case that the identification authentication data and the period data are used in combination"), based on the access policy described at the start of the description of the writing/reading apparatus of the first embodiment.

The control unit 31 notifies the host of the RAM area for the locked address as the area on which only the read is available, together with the RAM area for the unlocked address (S7). In other words, the area on which both of the write and the read are available (the RAM area for the unlocked address) and the area on which only the read is available (the RAM area for the locked address) are notified in step S7.

The writing/reading control is then performed, based on instructions from the host computer to the removable medium 39 which has such areas notified in step S7 (S8). In step S7, since the host computer is not notified of the presence of the ROM area, the control information stored on the ROM area is completely hidden from the host computer. After locking, even the RAM area is recognized as the area on which only the read is available, and if additional writing of information to the locked address is tried, an error process is performed by OS. In this way, for the contents on the RAM area, the lock is released by the predetermined user only for the available period to enable new creation, additionally writing and others, and for the locked contents, only the viewing is enabled, and validity of information will be ensured.

If the identification authentication data is used alone as the control item, then in the data lock determination in step S6, the identification authentication data recorded in the removable medium 39 and the identification authentication data given to the drive 30 are compared for each address, as described in the place regarding to the variations of the control items of FIG. 2 ("the case that the identification authentication data is used alone"). If the period data is used alone, then in the data lock determination in step S6, the period data recorded on the removable medium 39 and time information of the drive 30 are compared for each address, and whether it is within the available period or not is determined, as described in the place regarding to the variations of the control items of FIG. 2 ("the case that the period data is used alone").

In "the case that the identification authentication data and the period data are used in combination", if the identification authentication data is used as the key for the auto lock function, then in the data lock determination in step S6, whether it is within the available period or not is determined by the period data. If it is within the available period, that address will not be locked. If it is not within the available period, the user authentication based on the identification authentication data is performed, and if the authentication succeeds, that address will not be locked as well.

Also in this case, the control unit 31 notifies the host of the RAM area for the locked address as the area on which only the read is available, together with the RAM area for the unlocked address, in step S7. In this way, the owner of the key is able to modify the contents even after the available period. The access policy described at the start of the description of the writing/reading apparatus of the first embodiment is only an example, and its mode of access may be changed freely. If the data item other than the identification authentication data and period data is used as the used control item and is combined with other control items to perform the data lock determination in step S6, a process in conformity with the flowchart of FIG. 4 can be applied.

According to the first embodiment, by using the information record medium and the information writing/reading apparatus, it is possible to flexibly set types of access allowed to users and conditions when an auto lock function is activated. This information record medium is useful for applying to medical charts, inspection records and others for which interpolation is impermissible. Since the host computer recognize the information record medium of the first embodiment as media which only has the RAM area, the host computer will not access to the control information recorded on the ROM area for limiting the access to the contents, and a process of the control information is handled by the information writing/reading apparatus. Therefore, it is possible to prevent interpolation of information by impersonation on the host computer side, illegal copying and the like, and validity of information recorded on the information record medium is ensured. Further, since information in the ROM area (control information) and information in the RAM area (contents) can be simultaneously obtained by one-time access to an address, or reading of information in the ROM area and writing of information to the RAM area can be simultaneously performed, high-speed access can be achieved.

More specifically, since it is prevented that user data on the locked RAM area are rewritten and that false report data which are different from the report performed by authentic record creator are generated and since it is possible to identify a date when and a person by whom the information is recorded, advantages such as ensured originality of records and non-repudiation are generated. It is also possible to certainly comprehend a time history and a modification history of user records. Since the data lock is semi-automated based on date, labor of management using the host computer such as the management command is saved, and efficiency is achieved.

As a second embodiment, then described is the case that validity of information is ensured by use of the information record medium having the ROM area on which contents are recorded and the RAM area on which information for controlling is recorded. In the second embodiment, the concurrent ROMRAM described in FIG. 9 to FIG. 11 is also used.

In the second embodiment, contents are stored in advance in the ROM area, and by limiting access to (readout of) the contents based on the control information stored in the RAM area, validity of information is ensured. For example, it is possible to set up such that whether reading exceeds a limit number of times or not is determined by a number of times of reading stored in the control information and if it is within the limit, contents is read. It is also possible to set up that if it is within an available period defined by a play period recorded in the control information. By combining the number of times of play, the play period and other control items, it is possible to set various access modes, coordinated with purposes of use of the information record medium.

Figure 5:
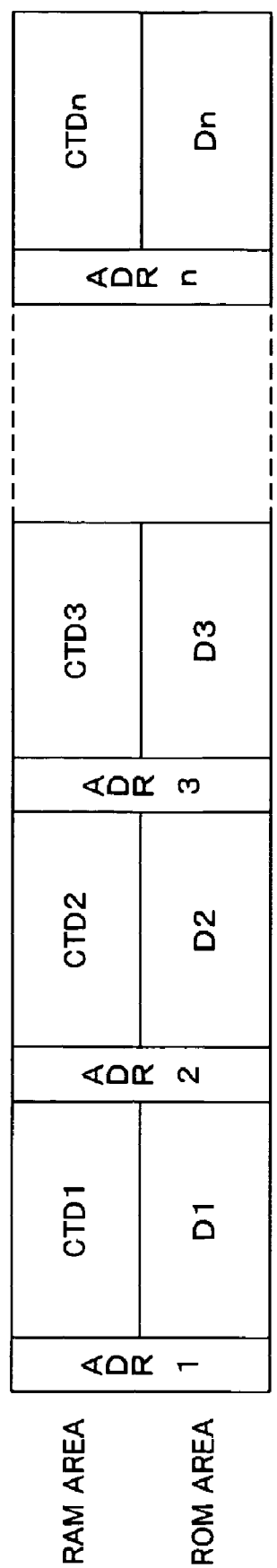
FIG. 5 is an explanatory diagram of relationship between contents and control information recorded on the information record medium of a second embodiment.

FIG. 5 is an explanatory diagram of relationship between contents and the control information recorded on the information record medium of the second embodiment. In FIG. 5, each of contents D1 to Dn (n is a natural number) stored in ROM area is managed by addresses ADR1 to ADRn, and the control information CTD 1 to CTDn for each content are stored on the RAM area which can be read by an addresses identical to the address corresponding to each content. This is the case that the pieces of information recorded on the ROM area and the RAM area of first embodiment are replaced each other.

By using the concurrent ROMRAM illustrated in FIG. 9 to FIG. 11, the ROM area and the RAM area can be managed by identical addresses. In this way, for any natural number i ($1 \leq i \leq n$), a content Di and control information CTDi corresponding to the content Di can be simultaneously obtained by one-time access to the address ADRi. The number of addresses n formed on the information record medium can be changed freely, coordinated with capacities of the information record medium, types of the contents stored, purposes of use of the information record medium and others.

As the content Di, general digital data are stored, which are movies (moving images), music, still images, plain texts, text data with format information (word processor data), spread sheet data, programs and others. Sizes of the ROM area and the RAM area at the address ADRi are equivalent and can be set to any size. For example, if one (1) movie is divided into a plurality of chapters, it is possible that the chapters correspond to each ROM area. Contrary, it is possible to divide a chapter such that the chapter is present across a plurality of addresses and form the content stored at each address. A size of the ROM area for each address (which is a size of the RAM area at the same time) is changed depending on the orderer's purpose of use of the removable medium 39. The simplest way is to coordinate the size to a minimum unit for recording of the drive.

Figures 6A, 6B:
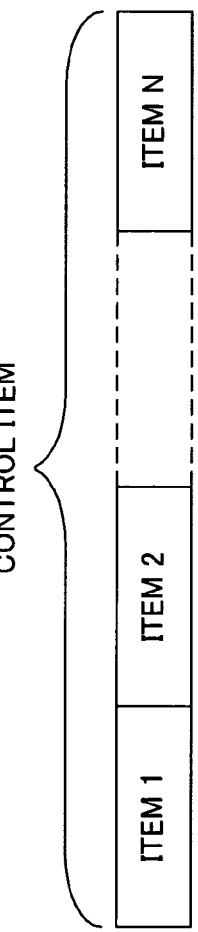
FIG. 6A shows an example of a data structure of the control information CTDi.
FIG. 6B is a diagram illustrating a specific example of the data structure of the control information.

FIG. 6A is an example of a data structure of the control information of FIG. 5. In the control information, a plurality of control items ITEMj ($1 \leq j \leq n$) is stored. The control items are not necessarily plural, and the case of single item may be considered.

FIG. 6B is a diagram illustrating a specific example of the data structure of the control information. In the control information of FIG. 6B, as an example of the control information CTDi corresponding to the contents Mi, a play count PCi, a play start date PSDi, a play end date PEDi, a can play period CPPi, a copy count CCi, copy start date CSDi, a copy end date CEDi and a can copy period CCPi are stored. The play start date, the play end date and the can play period of FIG. 6B are only a detailed representation of the period data Ti of the first embodiment. In other words, these three (3) items correspond to the period data. The same is true on the copy start date, the copy end date and the can copy period regarding to duplication.

The play count PCi is reduced by 1 every time the contents on the ROM area is played, and if it becomes 0, playout can not be performed anymore. Therefore, the content is played for the number of times set as an initial value only. As the play start date PSDi, the date on which the content is played for the first time is recorded. Therefore, nothing is recorded until playout is performed.

As the play end date PEDi, the final date on which the content can be played is recorded. As the can play period CPPi, a period for which a content can be played is recorded as a period from the play start date. Therefore, the play end date is obtained by adding the can play period to the play start date. The control items for copying are similarly to the control items for playout. As is the case with the first embodiment, the items corresponding to the play count and the period data (the start date, the end date and the available period) may be used individually or in combination.

A specific example to which the removal medium 39 (information record medium) of the second embodiment is applied is then described. For example, in the rental business which lends out record medium on which data of contents such as music, books and movies are recorded, the removable medium 39 can be applied in order to store the lent contents.

In the rental store, the control information stored in a removable medium 39 on which the lent contents are recorded, is rewritten for each user based on user request, and are passed to them. After returned, the control information is rewritten again depending on the request from another user, and the media is lent to the user. If not returned when the return time limit has been passed or, even when it is within the time limit, if playout or copy is performed for the number of times more than the limit count, the contents are locked, and information can not read, and therefore, illegal playout or copying which is departed from the scope allowed to the user is prevented.

Other than the control items shown in FIG. 6B, it is possible to incorporate items for limiting or extending playout of the contents, such as a release date (playout can be performed only if the current date is the same as or later than the release date) and the information for specifying the user who allowed to play (user name, password), into the control information. These control items may be used individually or in combination with other control items.

The information writing/reading apparatus and the operation of the information writing/reading apparatus used in the second embodiment are then described. For the purpose of simplification, following description of the second embodiment is assumed that an access policy is set, in which only if the authentication based on the play count succeeds and, by performing authentication based on the available period which is determined by the play start date, the play end date and the can play period, it is decided that it is within the available period (data lock released state), the contents can be played, and otherwise (data lock state), the access to the contents is refused (the presence of the contents itself can not be recognized from the host computer). Copying will not be performed. Rewriting of the control information on the RAM area will be performed only by an administrator who is allowed to use the drive.

FIG. 7 is a block diagram of the information writing/reading apparatus used in the second embodiment. The drive 30 includes a drive lock unit 41 which is used for certifying approval of use of the drive (the information writing/reading apparatus) 30 and an equipment-specific information holding unit 42, a control information rewrite unit which used for writing new control information, as well as a control unit 31 which is used for controlling writing/reading of the contents of the removable medium 39, a signal processing unit 33, an optical pick-up unit 34, a clock 38, a comparison unit 35 and a data lock unit 32.

In the equipment-specific information holding unit 42, a serial number which specifies the drive 30, a media type which can be used with the drive 30, data regarding to administrators allowed to use the drive 30 and others are recorded.

The drive lock unit 41 performs an authentication process for limiting use of the drive 30 to the qualified person (administrator). The drive lock unit 41 performs authentication to approve use of the drive 30 based on information in input drive lock release key and, if the authentication is failed, outputs a signal (drive lock signal) for halting the operation of the drive 30. If the authentication succeeds, use of the drive is continued as it is.

The drive lock release key includes the same kind of information as the information held by the equipment-specific information holding unit 42, and any piece of information or combination thereof is used for the authentication. The input and authentication of the drive lock release key are performed in various ways. By way of example, in a possible method, the drive lock unit 41 serves also as a memory reader, and flash memory in which the serial number of the drive 30 is recorded (drive lock release key) is distributed only to the administrator, and by inserting the flash memory into the drive lock unit 41 (memory reader), whether a drive serial number stored in the equipment-specific information holding unit 42 and the serial number in the flash memory are identical or not is decided.

In addition, employee numbers for individuals who are administrators may be stored in the equipment-specific information holding unit and whether or not an employee number input by a numeric pad equipped on the drive (drive lock release key) is identical to the employee number held be the equipment-specific information holding unit may be decided. Whether or not latitude and longitude of current position specified by the GPS function equipped in the drive lock release key is identical to latitude and longitude information indicating location of a factory held by the equipment-specific information holding unit 42 may be also decided. Further, a media type which can be,used may be recorded in the drive lock release key and whether or not this is identical to the media type included in disk specification information (the ROM area 101 or the ROM area 102) recorded on removable medium (information record medium) 39 which is inserted into the drive (information writing/reading apparatus) 30 may be decided.

Other than flash memory, cards with bar codes, magnetic cards, IC cards, physical keys, biometric fingerprints, irises and voiceprints, or hand-held devices can be used as the drive lock release key.

When the control information is input by the administrator who is allowed to use the drive 30, the control information rewrite unit executes a process for writing that control information onto the RAM area of the removable medium 39. The control information is supplied, for example, in the form of being included in the drive lock release key and, only if the administrator authentication in the drivelock unit 41 succeeds, read by the control information rewrite unit.

The drive lock unit 41 can function as the control information rewrite unit. In FIG. 7, a condition that the drive lock unit 41 and the control information rewrite unit are combined is illustrated, but a configuration in which these are separated may be available.

The drive lock unit 41, the equipment-specific information holding unit 42 and the control information rewrite unit are included in the information writing/reading apparatus of FIG. 7 in the case that the control information on the RAM area is needed to be rewritten (for example, the drive installed in the rental store), and if it is the information writing/reading apparatus used by a user who only plays the contents, the drive lock unit 41, the equipment-specific information holding unit 42 and the control information rewrite unit do not have to be included in the configuration. But, in this case, if the authentication process for approval of use of the drive 30 is wanted to be performed, the drive lock unit 41 and the equipment-specific information holding unit 42 may be included in the configuration.

When the removable medium 39 is inserted, the control unit 31 notifies the host computer (PC, server and others) connected to the drive 30 of only the presence of the ROM area out of the ROM area and the RAM area on the removable medium 39 and, when receiving a read instruction from the host computer, returns information read from the removable medium 39 to the host computer and executes a process for updating the control information such as the play count. The reason for notifying only the presence of the ROM area, which depends on that the control information is recorded on the RAM area in the second embodiment, is to prevent the control information from being input and output between the drive 30 and the host computer.

When the drive lock signal is input from the signal processing unit 33, the control unit 31 performs control to halt the drive 30 and, when the data lock signal is input from the signal processing unit 33, outputs information to the host computer such that accesses to the correspond contents are appropriately processed by OS of the host computer. Specifically, in order the locked contents to be hidden from the host computer, the control unit 31 notifies the host computer of the presence of the contents corresponding to the addresses for which the lock signals has not been input.

The signal processing unit 33 performs a process for digitizing analog source signals such as servo signals, format-related signals, the control information stored on the RAM area and the contents stored on the ROM area, which are input from the optical pick-up unit 34, and outputs these to the control unit 31 or to the comparison unit 35 (in the case of the control information). It also outputs new control information input from the control information rewrite unit to the optical pick-up unit 34. It receives the data lock signal input from the data lock unit 32 and the drive lock signal input from the drive lock unit 41 and outputs these to the control unit 31.

The optical pick-up unit 34 detects the control information, usage information of the disk, servo information and others, which are recorded on the removable medium 39, as the analog source signals. It also records information input from the signal processing unit 33 onto the removable medium 39. In this embodiment, the RAM area has magneto-optical records, and magnetic field modulation recording is employed, and it is possible to record the control information onto the RAM area simultaneously while detecting the contents on the ROM area as the analog source signals. It is also possible to simultaneously obtain the magneto-optical signals (control information) on the RAM area and the contents on the ROM area.

The clock 38 outputs accurate time information to the comparison unit 35.

The comparison unit 35 determines whether the play count is not less than 1 and whether it is within the available period, based on the control information input from the signal processing unit 33 and the time information input from the clock 38, and outputs the results of determination to the data lock unit 32.

The data lock unit 32 outputs the data lock signal to the signal processing unit 33 in the case such as that the play count or the copy count is 0 and that the available period is expired, depending on the results of the determination input from the comparison unit 35. In FIG. 7, the removable medium is inserted into the drive 30 by a slot-in mechanism or an electric tray and is not always contained in the drive 30.

The operation of the information writing/reading apparatus of the second embodiment is then described.

Figure 8:
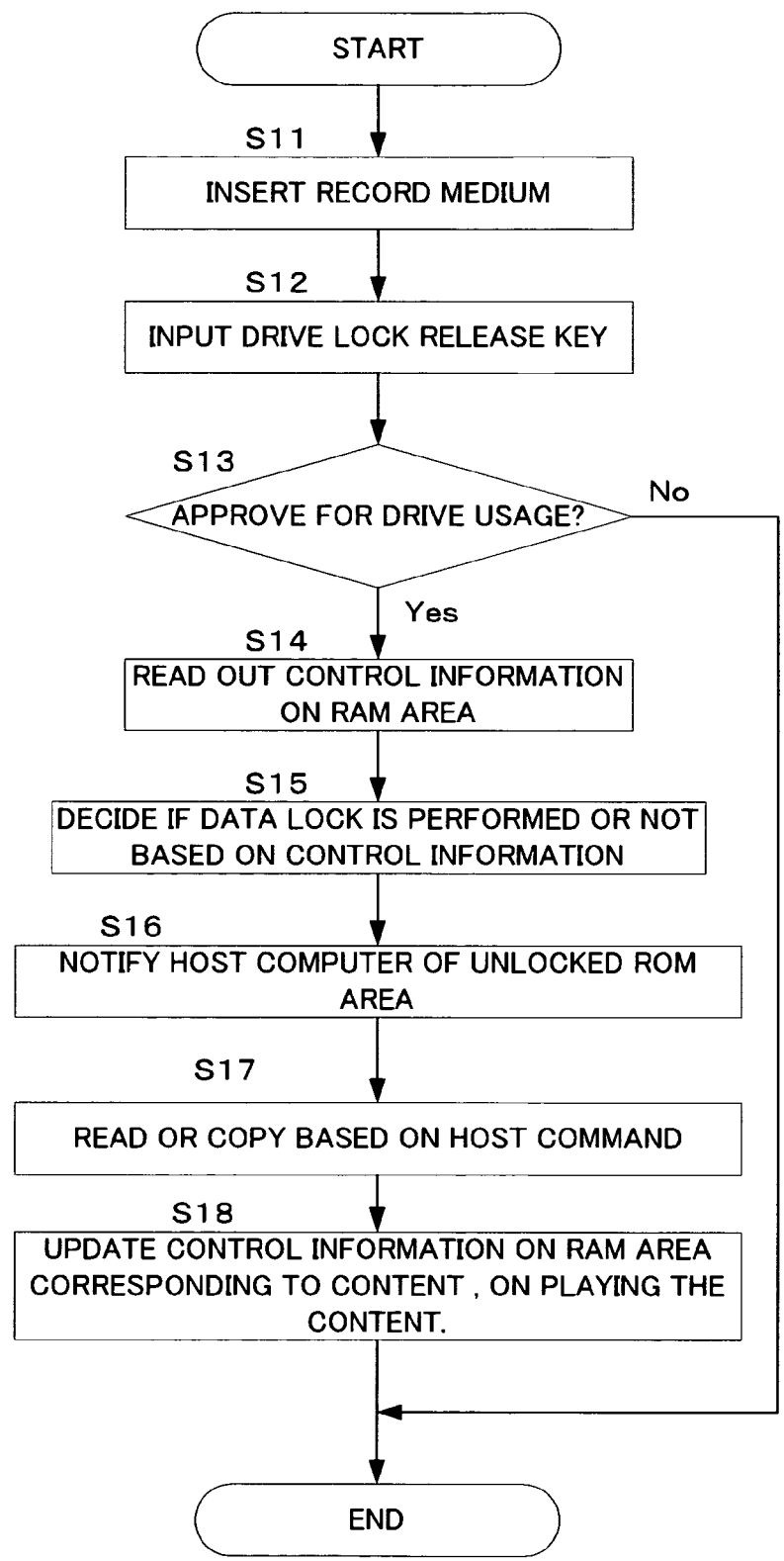
FIG. 8 is a flowchart describing the operation of the drive of the second embodiment.

FIG. 8 is a flowchart describing the operation of the drive (information writing/reading apparatus) 30 of the second embodiment. First, the removable medium 39 is inserted into the drive 30 (S11). The drive lock key is then input (S12). As described for the drive lock unit 41 of FIG. 7, the input of the drive lock key may take various forms depending on flash ROM, physical keys and others, and for example, a flash memory is inserted.

Then, whether the use of the drive 30 is approved or not is decided (S13). As described for the drive lock unit 41 of FIG. 7, the authentication of approval of use performed in step S13 may also take various forms depending on the drive lock keys, and for example, information of the qualified person (administrator) recorded in the equipment-specific information holding unit 42 is checked with the information recorded in the flash memory. If the control information on the RAM area does not have to be rewritten or if the authentication for use of the drive 30 is not performed, processes in step S12 and step S13 are omitted.

If the use of the drive 30 is not approved in step S13 (No in S13), the drive lock signal from the drive lock unit 41 is input to the control unit 31 via the signal processing unit 33, and the drive 30 is halted. If the use of the drive 30 is approved in step S13 (Yes in S13), the control information on the RAM area is subsequently read (S14), the data lock determination for the contents of each address is performed based on the read control information (S15).

In the determination in step S15, the authentication based on the play count and the authentication based on the available period defined by the play start date, the play end date and the can play period are performed for each address, based on the access policy described at the start of the description of the information writing/reading apparatus of the second embodiment. In other words, whether or not the play count included in the control information is equal to or greater than 1 is compared, and whether or not the time information input from the clock 38 is the same or earlier than the play end date is compared.

The control unit 31 hides the ROM area at the locked address from the host computer and notifies host computer of the removable medium 39 as if it only has the ROM area at the unlocked address (S16). The contents are played or copied, based on the instruction from the host computer to the removable medium 39 which has such areas notified in step S16 (S17). The control information on the RAM area corresponding to the address of the played (or copied) contents is updated in concurrence with the play (or copy) (S18). Specifically, the play count is reduced by 1.

In step S17, since the host computer is only notified of the ROM area, the control information stored on the RAM area is completely hidden from the host computer. Since the locked ROM area can not be accessed from the host computer, the contents of the ROM area are unlocked and can be played or copied only during the available period, and validity of information will be ensured.

In FIG. 7, the control items regarding to the playout are used, but if copy is allowed, the items regarding to the copy are used. It is possible to combine the items regarding to the play and copy. In this case, the authentication process based on the copy count and the authentication process based on the duplication available period determined by the copy start date, the copy end date and the can copy period are added to the data lock determination in step S15, and the process for reducing the copy count of the RAM area corresponding to the address of the duplicated contents is added to the step S17, but either process can be processed in the same way as each step of FIG. 8 which is performed regarding to the playout, and it is possible to apply the flowchart of FIG. 8 to the processes regarding to the duplication. If the playout and the copy are performed at the same time, each count and each date corresponding to the playout and the copy are updated.

The access policy described at the start of the description of the writing/reading apparatus of the second embodiment is only an example, and its mode of access may be changed freely. For example, an access policy may be set such that the playout and the copy are allowed before the data lock and only the playout is allowed after the data lock. The data items other than that of FIG. 6B may be used as the used control item and may be combined with other control items to perform the data lock determination in step S15. For example, these are the release date, the user authentication data for playout and others.

In the process of FIG. 8, before playing the contents, the control information for each address is read to perform the lock determination, and then the contents is played, and the control information is updated in concurrence with the play. If a large number of addresses exist, it is expected that readout of the control information takes very long time.

Therefore, in step S14, a play range in which addressed are specified may be input by the user, and only the control information on the RAM area corresponding to the addresses included in the play range may be read out.

Alternatively, at least three (3) places which are a start and an end address of the play range and any address in the middle of the play range may be sampled, and the control information on the RAM area corresponding to the addresses of the sampled place may be read out. In this case, a value advantageous for the user is used out of the read control information.

For example, in the case of the play count, a maximum value of the read play counts is considered as the play count of the contents included in the play range, and in the case of the play end date, a latest date is considered as the play end date of the contents included in the play range. When the control information is updated in step S18 (FIG. 8), all the control information included in the play range is updated to a value which is obtained by subtracting 1 from the maximum value. In this way, an opportunity to see and hear whole contents for the number of times of the play count is ensured for the user who only partially sees and hears the contents. It is expected that there are some rental stores which will not set up this user aid measure regarding to the copy count.

In step S14, when the control information on the RAM area is read out, contents on the ROM area may be simultaneously read out and stored in a memory which is not shown provided in the drive 30, and the contents stored in the memory may be sent to the host computer when the playout is performed in step S17. This has an advantage that the access to the memory is processed faster than the access to the removable medium 39 for of the contents.

According to the second embodiment, by using the information record medium and the information writing/reading apparatus, it is possible to flexibly set types of access allowed to users (playout, copy, or both) and conditions when the data lock function (the play end based on the play end date, the play start based on the release date and others) is activated. This information record medium is useful for applying to information record medium for selling or renting contents with copyright such as movies, music and novels. Since the host computer recognize the information record medium of the second embodiment as media which only has the ROM area, the host computer will not access to the control information recorded on the RAM area for limiting the access to the contents, and a process of the control information is handled by the information writing/reading apparatus. Therefore, it is possible to prevent interpolation of information by impersonation on the host computer side, illegal copying and the like, and validity of information recorded on the information record medium is ensured. Further, since information in the ROM area (contents) and information in the RAM area (control information) can be simultaneously obtained by one-time access to an address, or reading of information in the ROM area and writing of information to the RAM area can be simultaneously performed, high-speed access can be achieved.

More specifically, it is prevented that the control information on the RAM area are rewritten to be interpolated such that third parties other than allowed users can access to the contents, and in addition, it is possible to prevent the playout and the copy from being performed other than during a specified period. In this way, the contents with copyright can be appropriately protected. Since it is not needed to get authentication via network, this can be achieved without imposing the burden of effort on users. Since it is possible to update the RAM area in concurrence with playout, time gaps for fraudulences such as cheeting of the play count by power interruption before updating the control information can be eliminated. The control information can be freely set by a right holder (copyright holder, distributor ship owner), and advantages for the right holder can be enhanced. By checking the control information, it is also possible to monitor changes of status of usage histories, and by performing data analyses after returned from rental, application to marketing is also possible.

In the information writing/reading apparatus, if operations for the first embodiment and the second embodiment are switched depending on whether the area on which the control information is recorded is the ROM area or the RAM area, it is possible to make it perform a process corresponding to inserted information record medium. In this case, it is possible to handle the information record medium of both the first embodiment and the second embodiment in one (1) information writing/reading apparatus.

While illustrative and presently preferred embodiments of the present invention have been described in detail herein, it is to be understood that the inventive concepts may be otherwise variously embodied and employed and that the appended claims are intended to be constructed to include such variations except insofar as limited by the prior art.

What is claimed is:

1. An information writing/reading apparatus that cooperates with an information record medium including a ROM area and a RAM area, either the RAM area or the ROM area having in advance control information recorded thereon used to limit reading and/or writing of information,
   the information writing/reading apparatus comprising:
   an optical pick-up unit for reading information stored on the information record medium; and
   a control unit for, based on the control information read by the optical pick-up unit, limiting reading and/or writing of information from/to an other area on which the control information is not recorded and outputting a signal which notifies of presence of the other area only out of the ROM area and the RAM area on the information record medium, wherein
   the control information includes period data specifying an available period,
   the apparatus further comprising:
   a clock for outputting time information; and
   a comparison unit for comparing the period data included in the control information read by the optical pick-up unit with the time information output from the clock, to make a first determination to determine whether it is within the available time or not,
   the control unit limiting reading and/or writing of information from/to the other area depending on the result of the first determination, and
   when the control information is recorded on the ROM area, if it is not within the available period as a result of the first determination, the control unit imposes limitations such that reading of information from the RAM area is enabled but that writing of information to the RAM area is disabled.

2. The information writing/reading apparatus according to claim 1, wherein
   the control information includes identification authentication data identifying a user,
   the apparatus further comprising:
   an identification authentication data input unit for inputting information for identifying the user,
   the comparison unit comparing the identification authentication data included in the control information with the information for identifying the user input to the identification authentication data input unit, to make a second determination to determine whether the user is a normal user or not,
   the control unit limiting reading and/or writing of information from/to the other area depending on the result of the second determination.

3. The information writing/reading apparatus according to claim 1, wherein
   the control information includes identification authentication data identifying a user,
   the apparatus further comprising:
   an identification authentication data input unit for inputting information for identifying the user,
   the comparison unit comparing the identification authentication data included in the control information with the information for identifying the user input to the identification authentication data input unit, to make a second determination to determine whether the user is a normal user or not,
   the control unit limiting reading and/or writing of information from/to the other area depending on the result of the second determination.

4. The information writing/reading apparatus according to claim 1, further comprising;
   an equipment-specific information holding unit for holding therein recorded equipment-specific information on the information writing/reading apparatus; and
   a drive lock unit to which information relating to the information writing/reading apparatus is input,
   the drive lock unit collating the information relating to the information writing/reading apparatus input to the drive lock unit with the equipment-specific information and, if these are not identical, outputting a signal for halting operations of the information writing/reading apparatus to the control unit.

5. The information writing/reading apparatus according to claim 4, wherein
   the equipment-specific information used is any one of information for identifying a user who is permitted to use the information writing/reading apparatus, a serial number for identifying the information writing/reading apparatus, and a type of a record medium which can be used with the information writing/reading apparatus.

6. The information writing/reading apparatus according to claim 1, wherein
   when the control information is recorded on the ROM area of the information record medium, the ROM area and the RAM area are arranged in a superposed manner, with a minimum unit for recording of the ROM area being identical to a minimum unit for recording of the RAM area, the minimum unit for recording of the ROM area and the minimum unit for recording of the RAM area being managed by the same address, and wherein
   based on the control information on the ROM area obtained by an access to a predefined address, the control unit limits reading and/or writing of information from/to the RAM area which is simultaneously accessed by the access to the predefined address.

7. An information writing/reading apparatus that cooperates with an information record medium including a ROM area and a RAM area, either the RAM area or the ROM area having in advance control information recorded thereon used to limit reading and/or writing of information
   the information writing/reading apparatus comprising:
   an optical pick-up unit for reading information stored on the information record medium; and a control unit for, based on the control information read by the optical pick-up unit, limiting reading and/or writing of information from/to an other area on which the control information is not recorded and outputting a signal which notifies of presence of the other area only out of the ROM area and the RAM area on the information record medium, wherein when the control information is recorded on the RAM area of the information record medium, the ROM area and the RAM area are arranged in a superposed manner, with a minimum unit for recording of the ROM area being identical to a minimum unit for recording of the RAM area, the minimum unit for recording of the ROM area and the minimum unit for recording of the RAM area being managed by the same address, and wherein based on the control information on the RAM area obtained by an access to a predefined address, the control unit limits reading of information on the ROM area which is simultaneously accessed by the access to the predefined address.

8. The information writing/reading apparatus according to claim 7, wherein the control unit reads the information on the ROM area obtained by the access to the predefined address and simultaneously updates the control information on the RAM area corresponding to the predefined address.

9. An information writing/reading apparatus that cooperates with an information record medium including a ROM area and a RAM area, either the RAM area or the ROM area having in advance control information recorded thereon used to limit reading and/or writing of information, the information writing/reading apparatus comprising:

an optical pick-up unit for reading information stored on the information record medium; and a control unit for, based on the control information read by the optical pick-up unit, limiting reading and/or writing of information from/to an other area on which the control information is not recorded and outputting a signal which notifies of presence of the other area only out of the ROM area and the RAM area on the information record medium, wherein the control information includes period data specifying an available penod, the apparatus further comprising:

a clock for outputting time information; and a comparison unit for comparing the period data included in the control information read by the optical pick-up unit with the time information output from the clock, to make a first determination to determine whether it is within the available time or not, the control unit limiting reading and/or writing of information from/to the other area depending on the result of the first determination, and when the control information is recorded on the RAM area, if it is within the available period as a result of the first determination, the control unit enables reading of information from the ROM area, and otherwise imposes limitations such that reading of information from the ROM area is disabled.

10. An information writing/reading apparatus that cooperates with an information record medium including a ROM area and a RAM area, either the RAM area or the ROM area having in advance control information recorded thereon used to limit reading and/or writing of information, the information writing/reading apparatus comprising:

an optical pick-up unit for reading information stored on the information record medium; and a control unit for, based on the control information read by the optical pick-up unit, limiting reading and/or writing of information from/to an other area on which the control information is not recorded and outputting a signal which notifies of presence of the other area only out of the ROM area and the RAM area on the information record medium, wherein the control information includes period data specifying an available period, the apparatus further comprising:

a clock for outputting time information; and a comparison unit for comparing the period data included in the control information read by the optical pick-up unit with the time information output from the clock, to make a first determination to determine whether it is within the available time or not, the control unit limiting reading and/or writing of information from/to the other area depending on the result of the first determination, and when the control information is recorded on the RAM area, the control information further includes a play count defining an upper limit of the number of readout, the comparison unit making a third determination to determine whether the play count is not less than 1, the control unit limiting reading of information from the other area depending on the result of the third determination, and reducing the play count by 1 every time the information on the ROM area is read.

11. An information record medium comprising a ROM area and a RAM area, wherein either the ROM area or the RAM area has control information, recorded in advance thereon, used for limiting reading and/or writing of information, and wherein based on the control information, a limitation is imposed on reading and/or writing of information from/to an other area having no control information recorded thereon, with objects being limited which can read and/or write of the control information, the control information includes period data specifying an available period, the period data is compared with time information in order to determine whether it is within an available period or not, the period data being used for control such that reading and/or writing of information front/to the other area is limited depending on the result of the comparison, the control information is recorded on the ROM area, and as a result of the determination based on the period data, limitations are imposed such that reading of information from the RAM area is enabled but that writing of information to the RAM area is disabled.

12. The information record medium according to claim 11, wherein the control information includes identification authentication data specifying a user, and wherein the identification authentication data is compared with information for identifying a user in order to determine whether the user is a normal user or not, the identification authentication data being used for control such that reading and/or writing of information from/to the other area is limited depending on the result of the comparison.

13. The information record medium according to claim 11, wherein the ROM area and the RAM area are arranged in a superposed manner, wherein a recording unit of the ROM area is identical to a recording unit of the RAM area, wherein the recording unit of the ROM area and the recording unit of the RAfvl area are managed by the same address, wherein the control information recorded on either the ROM area or the RAM area is obtained by an access to each address, and wherein based on the control information obtained, a limitation is imposed on reading and/or writing of information from/to one having no control information recorded thereon out of the ROM area and the RAM area.

14. An information record medium comprising a ROM area and a RAM area, wherein either the ROM area or the RAM area has control information, recorded in advance thereon, used for limiting reading and/or writing of information, based on the control information, a limitation is imposed on reading and/or writing of information from/to an other area having no control information recorded thereon, with objects being limited which can read and/or write of the control information, the control information includes period data specifying an available period, the period data is compared with time information in order to determine whether it is within an available period or not, the period data being used for control such that reading and/or writing of information from/to the other area is limited depending on the result of the comparison, the control information is recorded on the RAM area, and wherein if it is within the available period as a result of the determination based on the period data, reading of information from the ROM area is enabled, and otherwise limitations are imposed such that reading of information from the ROM area is disabled.

15. An information record medium comprising a ROM area and a RAM area, wherein, either the ROM area or the RAM area has control information, recorded in advance thereon, used for limiting reading and/or writing of information, based on the control information, a limitation is imposed on reading and/or writing of information from/to an other area having no control information recorded thereon, with objects being limited which can read and/or write of the control information, the control information includes period data specifying an available period, the period data is compared with time information in order to determine whether it is within an available period or not, the period data being used for control such that reading and/or writing of information from/to the other area is limited depending on the result of the comparison, the control information further includes a play count defining an upper limit of the number of readout, the control information being recorded on the RAM area, and wherein the play count is used for control in which limitations are imposed such that reading of information on the ROM area is disabled when the play count becomes 0.

16. An information writing/reading system comprising:

an information writing/reading apparatus which incorporates an information record medium having a ROM area and a RAM area; and a host computer connected to the information writing/reading apparatus, wherein either the RAM area or the ROM area has control information, recorded in advance thereon, used for limiting reading and/or writing of information, and wherein the information writing/reading apparatus notifies the host computer of only presence of an area from/to which reading and/or writing of information is not disabled, out of an other area having no control information recorded thereon, based on the control information, and limits reading and/or writing of information from/to the enabled other area depending on instructions to the other area input from the host computer, the control information includes period data specifying an available period, the information writing/reading apparatus further makes a first determination to determine whether it is within the available period or not by comparing the period data included in the control information with time information output from a clock contained therein, and limits reading and/or writing of information from/to the other area depending on the result of the first determination, and when the control information is recorded on the ROM area, if it is not within the available period as a result of the first determination, the information writing/reading apparatus imposes limitations such that reading of information from the RAM area is enabled but that writing of information to the RAM area is disabled.

17. The information writing/reading system according to claim 16, wherein the control information further includes identification authentication data specifying a user, and wherein the information writing/reading apparatus further makes a second determination to determine whether the user is a normal user or not by comparing the identification authentication data included in the control information with the information included in a data lock release key input from outside, and limits reading and/or writing of information from/to the other area depending on the result of the second determination.

18. The information writing/reading system according to claim 16, wherein when the control information is recorded on the ROM area of the information record medium, the ROM area and the RAM area are arranged in a superposed manner, with a minimum unit for recording of the ROM area being identical to a minimum unit for recording of the RAM area, the minimum unit for recording of the ROM area and the minimum unit for recording of the RAM area being managed by the same address, and wherein based on the control information on the ROM area obtained by an access to a predefined address, the information writing/reading apparatus limits reading and/or writing of information from/to the RAM area which is simultaneously accessed by the access to the predefined address.

19. An information writing/reading system comprising:

an information writing/reading apparatus which incorporates an information record medium having a ROM area and a RAM area, and a host computer connected to the information writing/reading apparatus, wherein either the RAM area or the ROM area has control information, recorded in advance thereon, used for limiting reading and/or writing of information, the information writing/reading apparatus notifies the host computer of only presence of an area from/to which reading and/or writing of information is not disabled, out of an other area having no control information recorded thereon, based on the control information, and limits reading and/or writing of information from/to the enabled other area depending on instructions to the other area input from the host computer, when the control information is recorded on the RAM area of the information record medium, the ROM area and the RAM area are arranged in a superposed manner, with a minimum unit for recording of the ROM area being identical to a minimum unit for recording of the RAM area, the minimum unit for recording of the ROM area and the minimum unit for recording of the RAM area being managed by the same address, and wherein based on the control information on the RAM area obtained by an access to a predefined address, the information writing/reading apparatus limits reading of information from the ROM area which is simultaneously accessed by the access to the predefined address.

* * * * *

UNITED STATES PATENT AND TRADEMARK OFFICE
CERTIFICATE OF CORRECTION

| | | |
|---|---|---|
| PATENT NO. | : 7,362,677 B2 | Page 1 of 1 |
| APPLICATION NO. | : 10/818789 | |
| DATED | : April 22, 2008 | |
| INVENTOR(S) | : Yasuaki Morimoto | |

It is certified that error appears in the above-identified patent and that said Letters Patent is hereby corrected as shown below:

On the Title Page:

Under "U.S. Patent Documents" delete "7,009,239 B2* 3/2006 Tokuda et al. 257/302" and insert --7,099,239 Ogikubo 8/2006 369/30.23--.

In the Claims:

Col. 23, line 45, delete "penod" and insert --period--.

Col. 24, line 47, delete "front/to" and insert --from/to--.

Col. 25, line 6, delete "RAfvl" and insert --RAM--.

Signed and Sealed this

Fourteenth Day of October, 2008

JON W. DUDAS
*Director of the United States Patent and Trademark Office*